United States Patent [19]
Wide et al.

[11] Patent Number: 5,154,805
[45] Date of Patent: Oct. 13, 1992

[54] METHOD OF PREPARING CHLORATE

[75] Inventors: Ann Wide, Lidingö ; Per Widmark, Danderyd, both of Sweden

[73] Assignee: Eka Nobel AB, Bohus, Sweden

[21] Appl. No.: 706,185

[22] Filed: May 28, 1991

[30] Foreign Application Priority Data

May 29, 1990 [SE] Sweden ................................ 9001927

[51] Int. Cl.$^5$ ................................................ C25B 1/24
[52] U.S. Cl. ...................................... 204/95; 423/475; 23/296; 23/302 T
[58] Field of Search .................................. 204/94–95; 423/475; 23/296, 302 T

[56] References Cited

U.S. PATENT DOCUMENTS 4,702,805 10/1987 Burkell et al. .......................... 204/95

FOREIGN PATENT DOCUMENTS 676667 12/1963 Canada .

OTHER PUBLICATIONS

C. Moser, "Control of Sulphate in the Production of Crystal Sodium Chlorate", Modern Chloro-Alkali Technology, vol. 4, pp. 325–332.

Primary Examiner—John Nibeling
Assistant Examiner—David G. Ryser
Attorney, Agent, or Firm—Burns, Doane, Swecker & Mathis

[57] ABSTRACT

The invention discloses a method in the electrolytic production of alkali metal chlorate which is recovered by crystallization and separation of the crystals from a solution recycled to the electrolysis process. A given proportion of the crystals formed are separated and removed from the mother liquor after they have been in contact with the mother liquor for a shorter period of time than the remaining crystals, whereby they obtain a sulphate content which is higher than in the crystals that have been in contact with the mother liquor for a longer period of time.

27 Claims, 1 Drawing Sheet

METHOD OF PREPARING CHLORATE

BACKGROUND OF THE INVENTION

1. Field of the Invention

The present invention relates to a method in the electrolytic production of alkali metal chlorate which is obtained by crystallization and separation of the crystals from a solution recycled to the electrolysis process. A given proportion of the resulting crystals are separated and removed from the mother liquor after a time of contact with the mother liquor which is shorter than for the remaining crystals.

2. Description of the Prior Art

Alkali metal chlorate, in particular sodium chlorate, is used as a raw material in the production of chlorine dioxide which is an important bleaching chemical, especially for cellulose fibres. Sodium chlorate is produced by electrolysis of sodium chloride in aqueous solution. The solution circulates between an electrochemical reactor and reactor tanks in which further reactions take place. Part of the flow is conducted to a crystallizer in which sodium chlorate in solid form is recovered. The remaining part of the flow is recycled to the electrolysis reactor together with the mother liquor from the crystallizer and an equivalent amount of fresh sodium chloride. Crystallization takes place continuously or batchwise with direct, indirect or evaporative cooling. From the crystallizer, a slurry is taken from which the crystals are separated and washed. For easy handling, it is endeavoured to obtain relatively large crystals. Frequently, use is a made of a continuous crystallizer with classification, which implies that the mother liquor circulates in a manner such that the smallest crystals are taken along by a separate flow to which fresh solution is admixed, for recycling to the crystallizer.

The sodium chloride added is frequently contaminated by sulphate of which only a minor amount is removed from the system with the product. The sulphate is therefore accumulated in the electrolyte until the solubility product of sodium sulphate is exceeded. Depending upon local precipitations, however, difficulties arise in the form of excess voltages and increased energy costs already at lower sulphate contents in the electrolyte.

Sulphate can be removed from the system by precipitation with, for example, calcium or barium. However, this necessitates equipment for precipitation and filtration, simultaneously as the precipitate must be taken care of, for example dumped. In addition, calcium contents which are too high may cause precipitation on the cathodes, while high barium contents may cause irreversible reactions on the anodes.

U.S. Pat. No. 4,702,805 discloses a method in the electrolytic production of sodium chlorate, in which sulphate is removed from the system by causing a partial flow of the mother liquor from the chlorate crystallizer to undergo refrigeration, such that sodium chlorate crystals containing relatively large amounts of sulphate are formed and removed. The sulphate content in the electrolyte may be kept at such a low level that no difficulties arise. The idea is based on the fact that the solubility of sodium sulphate is substantially reduced at low temperatures, and this requires cooling to temperatures below 5° C., preferably below −5° C., and this again requires refrigerating equipment using refrigerants, such as freon or ammonia which normally are not available in chlorate production plants. This means that the investment and operating costs will be relatively high, and furthermore, the refrigerants are a hazard to the environment. Also, the mother liquor from the refrigeration has such a low temperature that it is not readily mixed with warmer electrolyte, so that layering or precipitation difficulties may arise. The chlorate crystallized by refrigeration is said to contain up to 11% by weight sodium sulphate, a content which is too high in many applications. The above technique is described also in C. Moser, "Control of Sulphate in the Production of Crystal Sodium Chlorate", Modern Chlor-Alkali Technology, Vol. 4, pp. 325–332.

SUMMARY OF THE INVENTION

Surprisingly, it has now been found feasible to obtain alkali metal chlorate crystals having increased sulphate content at far higher temperatures. The present invention is based on the insight that the initially formed alkali metal chlorate crystals have a higher sulphate content than those which, through a longer contact time with the mother liquor, have been allowed to grow to the size they have when usually separated therefrom. The invention thus relates to a method in the electrolytic production of alkali metal chlorate which is recovered by crystallization and separation of the crystals from a solution recycled to the electrolysis process, sulphate being removed from the system owing to higher sulphate content in part of the produced alkali metal chlorate crystals than in the rest of the crystals produced, in accordance with the appended claims.

BRIEF DESCRIPTION OF THE DRAWING

For a full understanding of the invention, the following detailed description should be read in conjunction with the drawing, wherein.

DETAILED DESCRIPTION OF THE PREFERRED EMBODIMENTS

Figure 1:
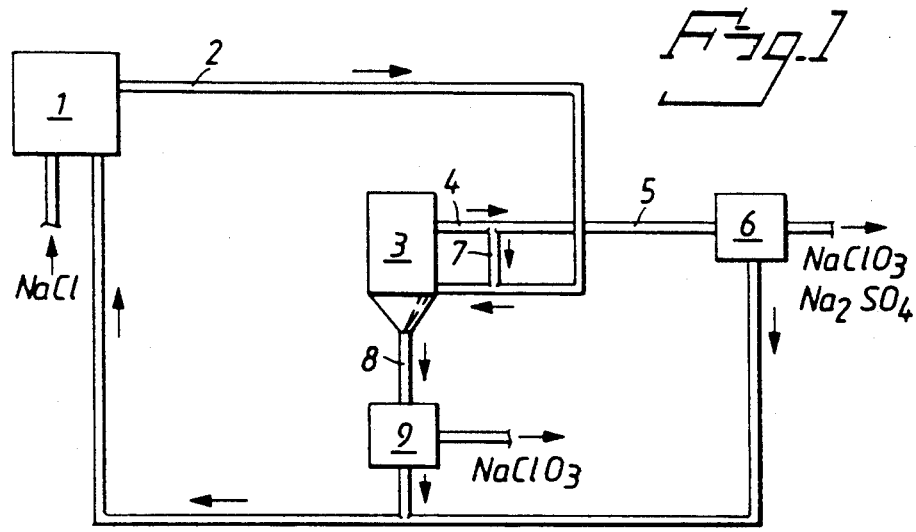
FIGS. 1, 2 and 3 are schematic illustrations of various embodiments of the invention.

According to the invention, a specific proportion of the crystals formed are separated and removed from the mother liquor after a contact time therewith which is shorter than for the remaining crystals, whereby they obtain a sulphate content which is higher than in the crystals that have been in contact with the mother liquor for a longer period of time. Without being committed to any specific theory, it is assumed that a solid solution is formed in which sulphate ions replace some of the chlorate ions in the sodium chlorate crystals. However, these are not stable in respect of the sulphate content, and the sulphate returns to the mother liquor if the contact time of the crystals with the mother liquor is too long. Contact time refers to the time from the formation of the crystal until it is completely separated from the mother liquor. It is difficult to indicate a numerical value of the contact time, but the time can be controlled by regulating parameters on which it depends, such as the residence time of the solution in the crystallizer, or the size of the crystals when separated from the mother liquor.

It has also been found that a high sulphate content is promoted by the rapid establishment of supersaturation in the solution. According to the invention, it is therefore suitable that the crystals having higher sulphate content are recovered from at least a part of the total amount of the solution from which crystals are recovered, the said part being subjected to rapid cooling and/or evaporation of solvent for rapidly establishing a supersaturated solution and obtaining crystals having higher sulphate content. Suitable numerical values of these parameters depend on the character of the individual chlorate process and can be determined experimentally by those skilled in the art. In most practical cases, it has been found suitable to rapidly establish supersaturation by cooling, such that the cooling rate is higher than 0.1° C. per minute, preferably higher than 0.2° C. per minute, especially higher than 0.25° C. per min. If supersaturation is established too quickly, the crystals will be small and diffucult to handle. The upper limit is set by the efficiency of the separation equipment. In actual practice, it is often preferred to have a cooling rate not higher than 1° C. per minute, preferably not higher than 0.7° C. per min. Cooling may take place directly, indirectly or evaporatively. In evaporative cooling, the removal of solvent contributes to the supersaturation, but this contribution is far less than the contribution given by the decrease of temperature, for which reason the suitable cooling rate is substantially the same as in cooling without evaporation. In continuous crystallization, the cooling rate is calculated according to the formula $Q \cdot (T_{in} - T_{out})/V$ wherein $Q$ is the volume flow of solution into the crystallizer, $V$ is the volume of solution in the crystallizer, $T_{in}$ and $T_{out}$ are, respectively, the incoming and the outgoing temperature. If the crystallizer is operated in such a manner that the smallest crystals are circulated in separate flows, without being removed as a product, the average residence time of the crystals will be longer than that of the solution, for which reason the cooling rate calculated according to the above formula should be slightly higher than otherwise, preferably higher than 1° C. per min.

To prevent the sulphate in the crystals having higher sulphate content from returning to the solution, these crystals should be separated relatively quickly from the mother liquor, suitably within 30 minutes, preferably within 20 minutes, after the cooling and/or the evaporation of solvent has been completed. In a continuous crystallizer, the time when cooling and/or evaporation has been concluded, is the time when the crystals having higher sulphate content leave the crystallizer.

It has been found suitable to take out crystals having higher sulphate content in an amount such that the sodium sulphate content in the electrolyte never exceeds 20 g/l. The exact amount taken out is adjusted to the amount of sulphate supplied to the process with the raw material, and to the amount removed together with the main product which usually contains from 20 to 100 mg sodium sulphate per kg. According to the invention, it is possible, by crystallization at temperatures below 6° C., in most cases below 15° C., to obtain alkali metal chlorate crystals containing from 200 to 2000 mg sodium sulphate per kg. In actual practice, it is frequently suitable that at least 3% by weight of the total product volume is taken out as crystals having higher sulphate content. Although it is possible to take out all of the product as crystals having higher sulphate content, it is often suitable, in actual practice, if the amount taken out is less than 50% by weight, preferably less than 30% by weight, of the total product volume.

Figure 2:
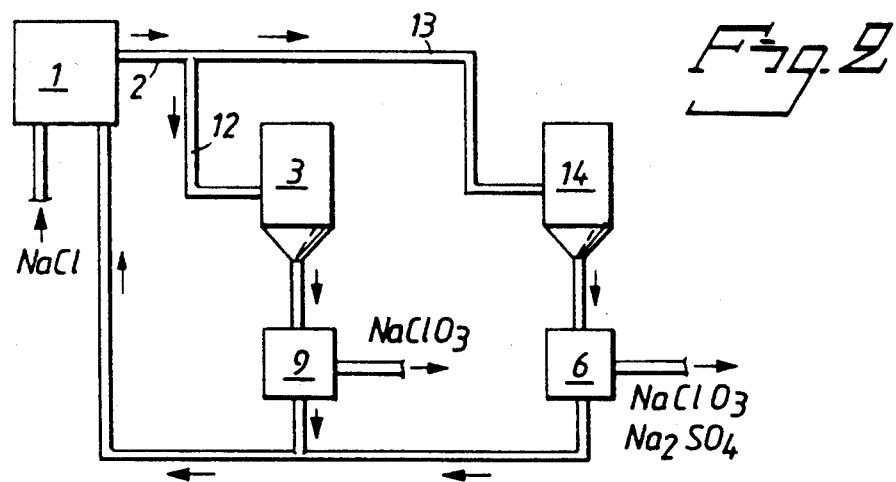
Figure 3:
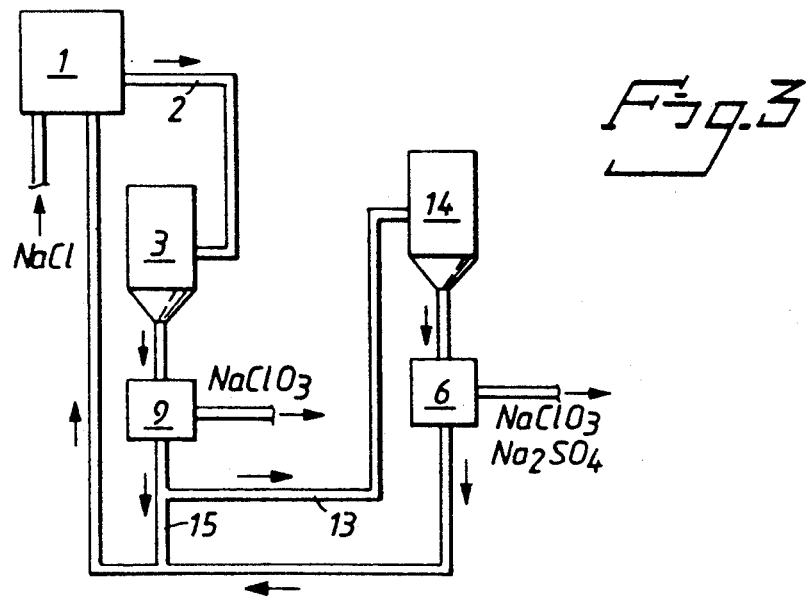

The invention will now be described in more detail, reference being made to the accompanying drawings in which FIGS. 1, 2 and 3 schematically illustrate different embodiments in the production of sodium chlorate. Even though the detailed descriptions are concerned with sodium chlorate, the invention is applicable also to the production of other alkali metal chlorates.

A preferred embodiment for obtaining chlorate crystals having higher sulphate content is to continuously separate crystals smaller than a predetermined size from the remaining crystals, and to separate and remove at least a part thereof from the mother liquor after they have been in contact with the mother liquor for a shorter period of time than the remaining crystals. A small crystal size is an indication that the crystals have recently been formed, for which reason the sulphate content is higher than in crystals that have grown to a larger size by having been in contact with the mother liquor for a longer period of time. By separating and removing at least a part of these small crystals from the mother liquor, the amount of sulphate leaving the process is increased. It has been found that the amount of sulphate is increased as the crystal size decreases, even though the content, at a given size, depends upon the properties of a given crystallizer, and on the operating parameters, such as the residence time, temperatures, cooling rate, evaporation rate, etc. The amount of sulphate removed can thus be controlled both by selecting a predetermined maximum size for the crystals separated from the remaining ones, and by selecting how large a proportion of these crystals that should be separated and removed from the mother liquor. The suitable amount and size are determined by economic optimization for each individual process. In actual practice, it is often suitable if crystals smaller than 250 μm, preferably smaller than 200 μm, are continuously separated from the remaining crystals, whereupon at least part of these crystals are separated and removed from the mother liquor. To prevent the sulphate from returning to the solution, separation should suitably be carried out within 30, preferably within 20 minutes, after the small crystals have been separated from the remaining crystals. Suitably, this is done by concentration and filtration of the slurry taken from the crystallizer, optionally completed with dewatering in a cyclone or centrifuge, whereupon the crystals are washed. To minimize dissolution, washing can be carried out with saturated chlorate solution.

A preferred method of separating the smallest crystals from the remaining crystals is to perform the crystallization in a crystallizer with classification, i.e. a crystallizer within which the mother liquor circulates in such a manner that crystals below a predetermined size are carried along by a separate flow. Instead of mixing this flow with freshly supplied solution for recycling to the crystallizer and, optionally, dissolution, as in a conventional crystallizer, at least part of these small crystals are separated and removed from the mother liquor and are thus taken out as product. In this manner, crystals having higher sulphate content are obtained, whereby the amount of sulphate leaving the process is higher than if merely crystals that have been allowed to grow to normal size had been taken from the process. Crystals having higher sulphate content can be recovered in this manner from at least one of several crystallizers connected in parallel, alternatively from one crystallizer from which all product is recovered. This embodiment is described in more detail in connection with FIG. 1 which illustrates schematically a process for the production of sodium chlorate.

The electrolysis process 1 to which sodium chloride is continuously supplied, is carried out by conventional technique and comprises the electrolysis stage in a plurality of electrolysis cells and further treatment stages in appropriate auxiliary equipment. From the process 1 an electrolyte flow 2 is obtained which is conducted to a crystallizer 3. Within or in connection with the crystallizer, crystals smaller than 250 μm, preferably smaller than 200 μm, are separated from the other crystals. Preferably, a crystallizer with classification is used in which the mother liquor circulates in such a manner that the smallest crystals are carried along by a separate flow 4 from which at least some crystals are separated and removed, for example by letting a partial flow 5 conduct the crystals to a separation equipment 6 in which the crystals are separated from the mother liquor. The solution can then be recycled to the electrolysis process 1, as shown in the Figure, or to the crystallizer 3. If any of the small crystals are not conducted to the separation equipment 6, they 7 are suitably mixed with the solution from the electrolysis process 2 for recycling to the crystallizer 3 and, optionally, dissolution. Preferably, use is made of a continuous vacuum crystallizer with evaporative cooling, but other types of crystallizers, such as batchwise or refrigerating crystallizers with indirect or direct cooling, and operating under atmospheric pressure, lie within the scope of the invention. The solution 2 conducted to the crystallizer 3 suitably has a temperature from 50° to 90° C., preferably from 60° to 75° C., while the mother liquor suitably has a temperature from 15° to 45° C., preferably from 25° to 40° C. The main product is taken out in the form of a slurry 8 which is conducted to a separation equipment 9 for conventional separation. The solutions relieved of solid phase are recycled to the electrolysis process 1, possibly after having been combined. It is also possible to separate the smallest crystals from the slurry 8 and to conduct at least a part of them to the first-mentioned separation equipment 6.

In some cases sufficient sulphate removal from the system can be achieved by recovering the crystals having a shorter time of contact with the mother liquor from a crystallizer from which all product is taken out in the form of a slurry, the crystals in the slurry which are smaller than a predetermined size being separated from the remaining crystals, and at least part of them being separated and removed from the mother liquor. In this instance, a crystallizer with classification is not necessary.

Since crystals having higher sulphate content, in accordance with the above description, unlike prior art technique, can be recovered from the same crystallizer as the main product, the investment demand will be relatively low. The sodium sulphate content of these crystals frequently is from 200 to 2000 mg/kg, which is acceptable for many applications. The main product usually contains from 20 to 110 mg sodium sulphate per kg.

Another preferred embodiment is to recover most of the alkali metal chlorate in at least one main crystallizer, while the chlorate having higher sulphate content is recovered in a separate crystallizer in which the residence time of the solution, after cooling and/or evaporation of solvent has begun, is comparatively short, suitably below 3 h, preferably below 1.5 h, which should be compared with residence times from 3 to 8 h in the main crystallizer. In this manner, the time during which the crystals are in contact with the mother liquor in the separate crystallizer is shortened, and the crystals thus will have a higher sulphate content. By using a separate crystallizer, it is easier to regulate the process parameters for obtaining the crystals, such as the residence time, temperatures, cooling rate, evaporation rate etc. so that the sulphate content therein can be more easily controlled. After cooling and/or evaporation of the solvent has been completed, the crystals should be separated from the mother liquor within 30 minutes, preferably within 20 min. The separate crystallizer can operate continuously or batchwise, with direct, indirect or evaporative cooling. However, in view of the investment and operating costs, batchwise operation of the separate crystallizer is preferred, preferably under atmospheric pressure. The cooling rate should preferably be from 0.1 to 1° C./minute, preferably from 0.2 to 0.6° C./minute, especially from 0.25 to 0.5° C./min. If the separate crystallizer is a continuous crystallizer with classification, such that the smallest crystals are recycled to the crystallizer without being taken out, the cooling rate should preferably be from 1 to 3° C./min. In a batchwise crystallizer, the crystals can sediment, whereupon they can be separated from the mother liquor by filtration and washing, optionally with saturated chlorate solution. Dewatering can also be carried out in a cyclone or centrifuge. If the crystallizer is continuous, a slurry can be taken out and, optionally, be concentrated before the crystals are separated in the above manner. If use is made of several main crystallizers, they should be connected in parallel.

A preferred mode of execution of this embodiment is to recover the crystals having higher sulphate content in a separate crystallizer connected in parallel with the main crystallizer, as is described in more detail in connection with FIG. 2 which schematically illustrates a process for the production of sodium chlorate. An electrolyte flow 2 from the electrolysis process 1 is divided into two partial flows. One flow 12 is conducted to a main crystallizer 3 which can operate continuously or batchwise, with direct, indirect or evaporative cooling, although continuous operation under vacuum with evaporative cooling is most preferred. The main crystallizer is preferably supplied with a solution having a temperature from 50° to 90° C., preferably from 60° to 75° C., while the mother liquor suitably has a temperature from 15° to 45° C., preferably from 25° to 40° C. The slurry from the crystallizer 3 is supplied to a separator 9 in which the crystals are separated and removed in known manner. The other partial flow 13 of electrolyte is conducted to a separate crystallizer 14 connected to a separator 6 in which the crystals are separated and removed from the mother liquor. Also the separate crystallizer 14 may operate continuously or batchwise, with direct, indirect or evaporative cooling. The solution supplied suitably has a temperature from 35° to 90° C., preferably from 45° to 75° C., while the mother liquor suitably has a temperature from 15° to 45° C., preferably from 25° to 40° C. It is preferred to lower the original temperature of the electrolyte in the partial flow 13 by utilizing some of its thermal energy for heating purposes. The sodium chloride crystals recovered from the separate crystallizer 14 have a far higher sodium sulphate content, usually from 200 to 2000 mg/kg, than those recovered in the main crystallizer 3, usually from 20 to 100 mg/kg. The solutions from the separators 6, 9, from which solid matter has been removed, are recycled to the electrolysis process 1, possibly after they have been combined. The flows 12, 13 to the crystallizers are distributed with regard to several different factors, above all the amount of sulphate supplied to the process, and the sulphate contents in the products from the respective crystallizer, which contents can be controlled by residence times, cooling rates and other process parameters. Since the amount of crystals from a given amount of solution depends upon the degree of cooling and/or evaporation in the crystallizer, it is impossible to indicate a general numerical value of the flow distribution. If both the crystallizers are of the same type, with the same degree of cooling and evaporation of solvent, from about 3 to about 50% by weight, preferably from about 3 to about 30% by weight of the flow should go to the separate crystallizer, thereby to ensure that from 3 to 50 and from 3 to 30% by weight, respectively, of the total product volume consists of crystals having higher sulphate content.

Another preferred mode of execution is to recover the crystals having higher sulphate content in a separate crystallizer supplied with at least a part of the mother liquor from the main crystallizer. This is described in connection with FIG. 3 which schematically illustrates a process for the production of sodium chlorate. An electrolyte flow 2 from the electrolysis process 1 is conducted to a main crystallizer 3 connected with a separator 9 in which most of the sodium chlorate is recovered. The crystallizer 3 and the separator 9 operate in the same manner as described above in connection with FIG. 2. At least a part 13 of the mother liquor (which contains no solid phase) from the separator 9 is conducted to a separate crystallizer 14 connected to a separator 6 in which sodium chlorate crystals having higher sulphate content are recovered. It is also possible to conduct mother liquor directly from the main crystallizer 3 to the separate crystallizer 14. How large a proportion of the total volume of mother liquor from the main crystallizer should be conducted to the separate crystallizer 14 depends on several different factors, primarily the amount of sulphate supplied to the process and the sulphate contents in the products from the respective crystallizer, which contents can be controlled by residence times, cooling rates and other process parameters. Since the amount of crystals from a given amount of solution depends on the chlorate and sulphate contents in the solution, and on the degree of cooling and/or evaporation in the crystallizer, it is impossible to indicate a general numerical value. If the mother liquor from the main crystallizer 3 has a temperature of 30° C. and is cooled to 15° C. in the separate crystallizer, from about 5 to about 85% of the mother liquor should preferably be conducted thereto. In many cases, it is suitable to conduct more than half or even the entire flow 13 to the separate crystallizer 14. The separate crystallizer 14 is suitably supplied with a solution having a temperature from 15 to 45° C., preferably from 25° to 40° C., while the mother liquor suitably has a temperature from 6° to 30° C., preferably from 6° to 25° C. In other respects, the crystallizer 14 and the separator 6 function in the same manner as described above in connection with FIG. 2. Also the sulphate contents in the chlorate crystals from the respective crystallizer lie on the same level as when the crystallizers are connected in parallel. The outgoing solution from the separator 6 is recycled to the electrolysis process 1. In the event that some of the solution from the separator 9 is not conducted to the separate crystallizer, also this part of the solution is recycled to the electrolysis process.

Compared to prior art technique, the invention as described above has considerable advantages. Unlike the refrigeration technique referred to in the introduction, the requisite cooling can be obtained with water-based systems which frequently are already available in a chlorate factory, and furthermore there are no difficulties due to excessive temperature differences in the solutions to be mixed. Thus, it is comparatively simple and inexpensive to supplement an existing process with the method according to the invention. Unlike the refrigeration technique, no part of the chlorate produced has a higher sulphate content than is acceptable in most applications.

The invention will now be illustrated by the following nonrestrictive Examples. All contents are in parts by weight, unless otherwise indicated.

EXAMPLE 1

4 l electrolyte from a sodium chlorate process having a temperature of 70° C. and containing 600g/l $NaClO_3$, 115 g/l NaCl and 13.6 g/l $Na_2SO_4$, was divided into two batches of equal size. One batch was cooled under agitation to 22° C. in 25 minutes, i.e. 1.92° C./minute, the resulting crystals containing 2070 ppm $NaSO_4$. The other batch was cooled under agitation to 22° C. in 3 h and 40 minutes, i.e. 0.22° C./minute, the resulting crystals containing 414 ppm $NaSO_4$.

EXAMPLE 2

100 l mother liquor from a sodium chlorate crystallizer containing 520 g/l $NaClO_3$, 152 g/l NaCl and 13.6 g/l $Na_2SO_4$ was conducted to a crystallizer operating batchwise under atmospheric pressure and was cooled in 60 minutes under agitation from 27.5 to 11.5° C., i.e. 0.27° C./minute. The solution was then allowed to stand for 30 minutes under agitation, whereupon the sodium chlorate crystals were allowed to sediment and were then filtered off and washed. They contained 89 ppm $Na_2SO_4$.

EXAMPLE 3

100 l mother liquor from a sodium chlorate crystallizer containing 500 g/l $NaClO_3$, 138 g/l NaCl and 12.4 g/l $Na_2SO_4$ was conducted to a crystallizer operating by batches under atmospheric pressure and was cooled under agitation for 30 minutes from 27.0 to 12.0° C., i.e. 0.5° C./minute. The solution was then allowed to stand for 15 minutes under agitation, whereupon the sodium chlorate crystals were allowed to sediment and were then filtered off and washed. They contained 990 ppm $Na_2SO_4$.

EXAMPLE 4

19 $m^3$ electrolyte from a sodium chlorate process containing 463 g/l $NaClO_3$, 105 g/l NaCl and 16.8 g/l $Na_2SO_4$ was conducted to a crystallizer operating by batches under atmospheric pressure and was cooled under agitation for 60 minutes from 38° to 21.0° C., i.e. 0.28° C./minute. The resulting sodium chlorate crystals were immediately allowed to sediment and were then filtered off and washed. They contained 1630 ppm $Na_2SO_4$ and had an average diameter of 190 $\mu m$.

The Examples show that a high cooling rate and a short contact time between the crystals and the mother liquor gives a higher sulphate content in the crystals.

EXAMPLE 5

A continuous 40 m$^3$ vacuum crystallizer with classification and a total production of about 7 tonnes NaClO$_3$/h was supplied with 40 m$^3$ electrolyte per hour, the electrolyte having a temperature of 70° C., and the mother liquor having a temperature of 32° C. and containing 600 g/l NaClO$_3$, 115 g/l NaCl and 15 g/l NaSO$_4$. The cooling rate $Q \cdot (T_{in} - T_{out})/V$ thus was 0.63° C./minute. Crystals of a size below 90 μm contained, on an average, 1323 ppm NaSO$_4$, crystals having a size from 250 to 500 μm contained 73.5 ppm Na$_2$SO$_4$ and crystals having a size exceeding 1.6 mm contained 44.1 ppm Na$_2$SO$_4$.

As will appear from this Example, it is possible to remove from the process crystals having higher sulphate content by continuously separating crystals below a predetermined size from the remaining crystals, and to separate and remove them from the mother liquor.

We claim:

1. In a method for the electrolytic production of alkali metal chlorate obtained by crystallization and separation of the crystals from an aqueous solution recycled to the electrolysis process, wherein sulphate is removed from the system owing to a higher sulphate content in part of the produced alkali metal chlorate crystals than in the rest of the crystals produced, the method comprising the steps of:
   (a) forming alkali metal chlorate crystals in a mother liquor formed from the aqueous solution; and
   (b) separating and removing a portion of crystals so formed from the mother liquor after said portion of crystals has been in contact with the mother liquor for a shorter period of time than the remaining crystals, whereby the removed portion of crystals have a sulphate content higher than in the remaining crystals.

2. A method as claimed in claim 1, wherein the removed crystals are recovered from at least a portion of the aqueous solution from which crystals are recovered, said portion being subjected to cooling and/or evaporation of solvent to thereby establish a supersaturated solution from which the removed crystals are obtained.

3. A method as claimed in claim 2, wherein said supersaturation is established by a cooling rate higher than about 0.1° C. per minute.

4. A method as claimed in claim 3, wherein the removed crystals are separated from the mother liquor formed from the aqueous solution within 30 minutes after cooling and/or evaporation of solvent has been completed.

5. A method as claimed in claim 3, including the step of continuously separating crystals smaller than a predetermined size from the remaining crystals, at least a part of the separated crystals being separated and removed from the mother liquor after they have been in contact therewith for a shorter period of time than the remaining crystals.

6. A method as claimed in claim 3, wherein the remaining crystals of alkali metal chlorate are recovered in at least one main crystallizer, and wherein the removed chlorate crystals that have been in contact with the mother liquor for a shorter period of time are recovered in a separate crystallizer.

7. A method as claimed in claim 2, wherein the removed crystals are separated from the mother liquor formed from the aqueous solution within 30 minutes after cooling and/or evaporation of solvent has been completed.

8. A method as claimed in claim 7, including the step of continuously separating crystals smaller than a predetermined size from the remaining crystals, at least a part of the separated crystals being separated and removed from the mother liquor after they have been in contact therewith for a shorter period of time than the remaining crystals.

9. A method as claimed in claim 7, wherein the remaining crystals of alkali metal chlorate are recovered in at least one main crystallizer, and wherein the removed chlorate crystals that have been in contact with the mother liquor for a shorter period of time are recovered in a separate crystallizer.

10. A method as claimed in claim 2, including the step of continuously separating crystals smaller than a predetermined size from the remaining crystals, at least a part of the separated crystals being separated and removed from the mother liquor after they have been in contact therewith for a shorter period of time than the remaining crystals.

11. A method as claimed in claim 2, wherein the remaining crystals of alkali metal chlorate are recovered in at least one main crystallizer, and wherein the removed chlorate crystals that have been in contact with the mother liquor for a shorter period of time are recovered in a separate crystallizer.

12. A method as claimed in claim 1, including the step of continuously separating crystals smaller than a predetermined size from the remaining crystals, at least a part of the separated crystals being separated and removed from the mother liquor after they have been in contact therewith for a shorter period of time than the remaining crystals.

13. A method as claimed in claim 12, wherein crystals of a size below about 250 um are continuously separated.

14. A method as claimed in claim 13, wherein the separated crystals are recovered from a crystallizer in which the mother liquor circulates in such a manner that crystals below a predetermined size are taken along by a separate flow from which at least some crystals are separated and removed.

15. A method as claimed in claim 13, wherein the separated crystals are recovered from a crystallizer from which all product is taken out in the form of a slurry, the crystals in the slurry below a predetermined size being separated from the remaining crystals, and at least a part thereof being separated and removed from the mother liquor.

16. A method as claimed in claim 12, wherein the separated crystals are recovered from a crystallizer in which the mother liquor circulates in such a manner that crystals below a predetermined size are taken along by a separate flow from which at least some crystals are separated and removed.

17. A method as claimed in claim 12, wherein the separated crystals are recovered from a crystallizer from which all product is taken out in the form of a slurry, the crystals in the slurry below a predetermined size being separated from the remaining crystals, and at least a part thereof being separated and removed from the mother liquor.

18. A method as claimed in claim 1, wherein the remaining crystals of alkali metal chlorate are recovered in at least one main crystallizer, and wherein the removed chlorate crystals that have been in contact with the mother liquor for a shorter period of time are recovered in a separate crystallizer.

19. A method as claimed in claim 18, wherein the residence time of the solution in the separate crystallizer, after cooling and/or evaporation of solvent has begun, is below about 3 h.

20. A method as claimed in claim 19, wherein the separate crystallizer is operated batchwise.

21. A method as claimed in claim 17, wherein the separate crystallizer is connected in parallel with the main crystallizer 22. A method as claimed in claim 19, wherein the separate crystallizer is supplied with at least a part of the mother liquor from the main crystallizer.

23. A method as claimed in claim 18, wherein the separate crystallizer is operated batchwise.

24. A method as claimed in claim 23, wherein the separate crystallizer is connected in parallel with the main crystallizer.

25. A method as claimed in claim 23, wherein the separate crystallizer is supplied with at least a part of the mother liquor from the main crystallizer.

26. A method as claimed in claim 18, wherein the separate crystallizer is connected in parallel with the main crystallizer.

27. A method as claimed in claim 18, wherein the separate crystallizer is supplied with at least a part of the mother liquor from the main crystallizer.

* * * * *